US009472221B1

(12) United States Patent
Bui et al.

(10) Patent No.: US 9,472,221 B1
(45) Date of Patent: *Oct. 18, 2016

(54) ADJUSTABLE SPACING FORMATTER HEAD

(71) Applicant: International Business Machines Corporation, Armonk, NY (US)

(72) Inventors: Nhan X. Bui, Tucson, AZ (US); Edwin R. Childers, Tucson, AZ (US); Kevin B. Judd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,947

(22) Filed: Apr. 25, 2016

Related U.S. Application Data

(63) Continuation of application No. 14/752,930, filed on Jun. 27, 2015, now Pat. No. 9,373,346.

(51) Int. Cl.
*G11B 5/48* (2006.01)
*G11B 5/008* (2006.01)

(52) U.S. Cl.
CPC ......... *G11B 5/4893* (2013.01); *G11B 5/00813* (2013.01)

(58) Field of Classification Search
None
See application file for complete search history.

(56) References Cited

U.S. PATENT DOCUMENTS

| 5,513,051 A | 4/1996 | Lee et al. |
| 6,757,128 B2 | 6/2004 | Yip |
| 6,771,456 B2 | 8/2004 | Winarski et al. |
| 6,937,413 B2 | 8/2005 | Bui et al. |
| 7,342,738 B1 | 3/2008 | Anderson et al. |
| 7,492,545 B1 | 2/2009 | Spaur et al. |
| 7,576,949 B2 | 8/2009 | Dugas et al. |
| 7,764,460 B2 | 7/2010 | Bates et al. |
| 8,000,056 B2 | 8/2011 | Bates et al. |
| 8,094,406 B2 | 1/2012 | Bates et al. |
| 8,184,394 B2 | 5/2012 | Poorman et al. |

(Continued)

FOREIGN PATENT DOCUMENTS

| EP | 0014311 A1 | 8/1980 |
| EP | 0704837 A1 | 4/1996 |
| GB | 2375877 A | 11/2002 |

OTHER PUBLICATIONS

List of IBM Patents or Patent Applications Treated as Related.

(Continued)

*Primary Examiner* — Wayne Young
*Assistant Examiner* — James L Habermehl
(74) *Attorney, Agent, or Firm* — Zilka-Kotab, PC

(57) ABSTRACT

A computer program product, according one embodiment, includes a computer readable storage medium having program instructions embodied therewith, the program instructions readable and/or executable by a processing circuit to cause the processing circuit to: determine, by the processing circuit, an actual spacing between at least two servo tracks written on a magnetic tape based on signals from at least two servo writer elements; compare, by the processing circuit, the actual spacing with an intended spacing between the at least two servo tracks; and use, by the processing circuit, at least one actuator sandwiched between the servo writer elements to adjust a distance between the servo writer elements in response to determining that a difference between the actual spacing and the intended spacing is in a predetermined range.

16 Claims, 12 Drawing Sheets

(56) References Cited

U.S. PATENT DOCUMENTS

| | | |
|---|---|---|
| 8,724,247 B2 | 5/2014 | Poorman et al. |
| 8,773,810 B2 | 7/2014 | Biskeborn et al. |
| 9,373,346 B1 | 6/2016 | Bui et al. |
| 2006/0171060 A1 | 8/2006 | Anderson et al. |
| 2007/0217051 A1 | 9/2007 | Shen et al. |
| 2009/0116366 A1 | 5/2009 | Ramakrishnan et al. |
| 2012/0188665 A1 | 7/2012 | Biskeborn et al. |

OTHER PUBLICATIONS

Du et al., "Timing Jitter Modeling and Minimization for a Servo Track Writer," IEEE Transactions on Magnetics, vol. 43, No. 9, Sep. 2007, pp. 3769-3773.

Fan et al., "Magnetic Recording Head Positioning at Very High Track Densities Using a Microactuator-Based, Two-Stage Servo System," IEEE Transactions on Industrial Electronics, vol. 42, No. 3, Jun. 1995, pp. 222-233.

Bui et al., U.S. Appl. No. 14/752,930, filed Jun. 27, 2015.

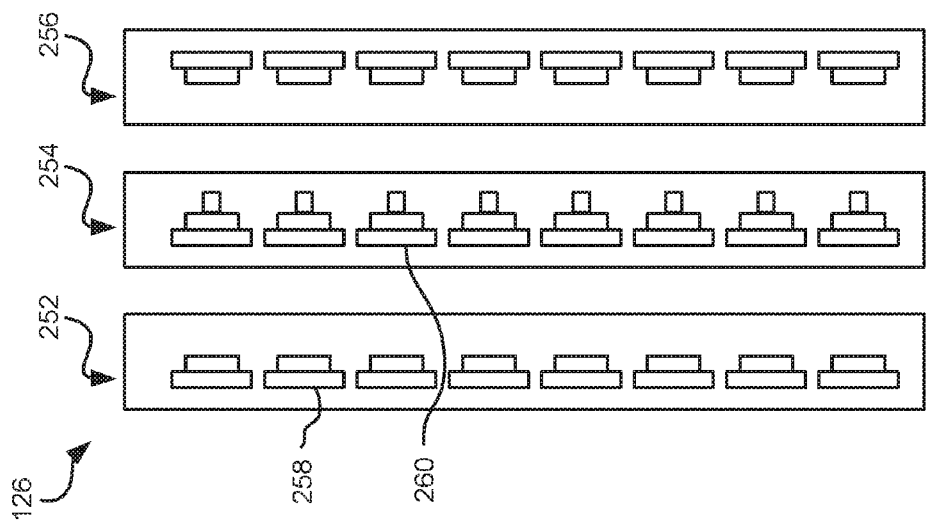
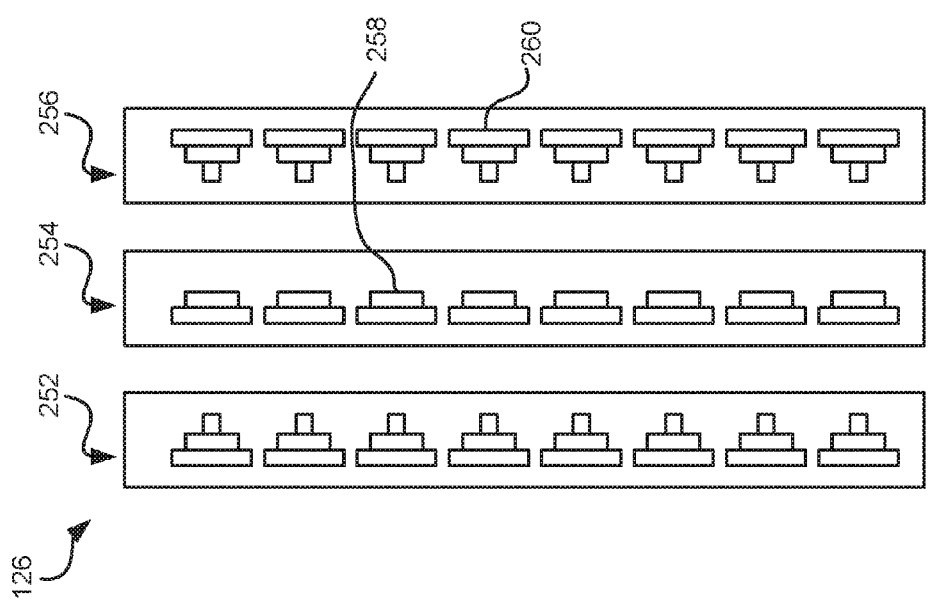

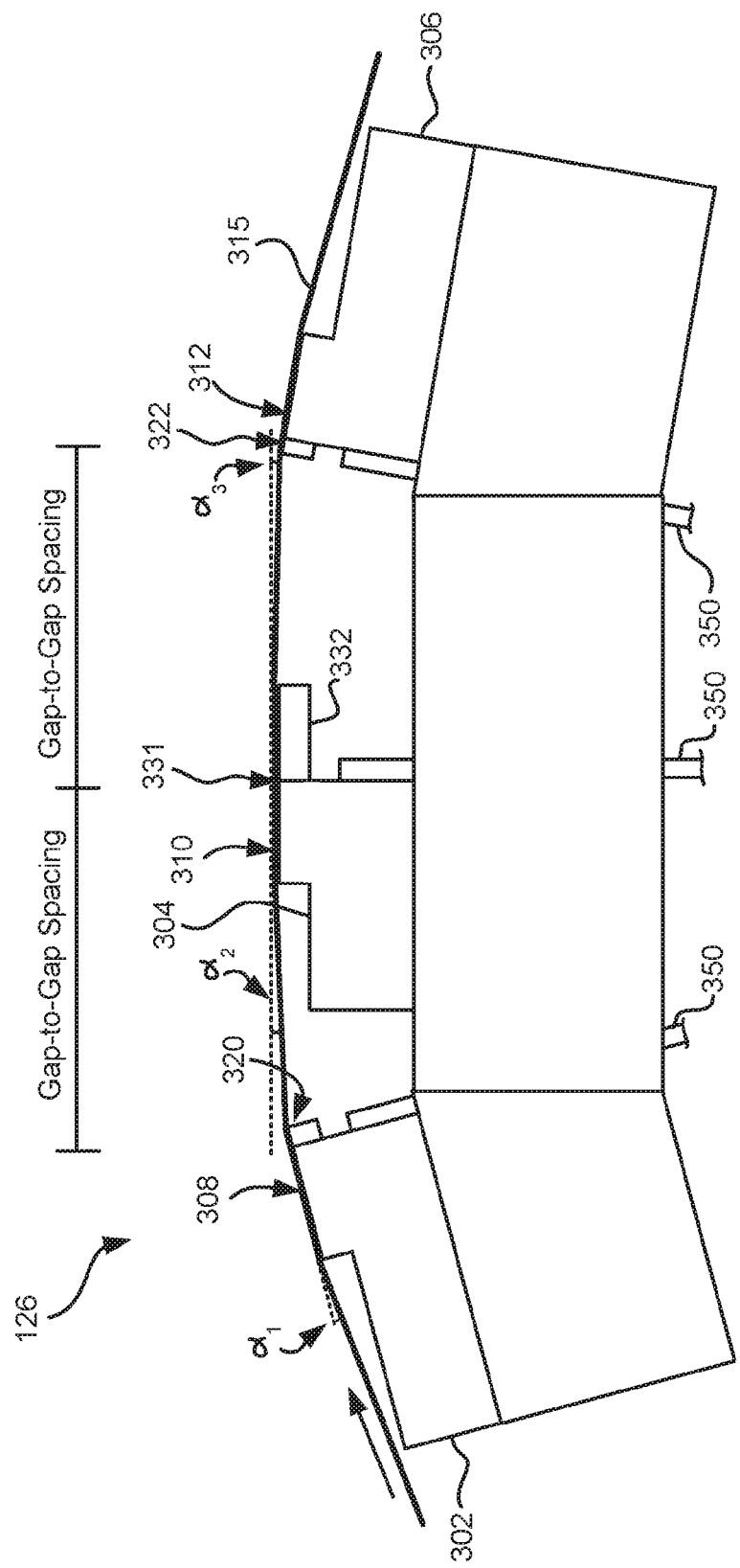

ADJUSTABLE SPACING FORMATTER HEAD

BACKGROUND

The present invention relates to data storage systems, and more particularly, this invention relates to servo track formatter heads having adjustable spacing offsets between the servo tracks.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

A computer program product, according one embodiment, includes a computer readable storage medium having program instructions embodied therewith, the program instructions readable and/or executable by a processing circuit to cause the processing circuit to: determine, by the processing circuit, an actual spacing between at least two servo tracks written on a magnetic tape based on signals from at least two servo writer elements; compare, by the processing circuit, the actual spacing with an intended spacing between the at least two servo tracks; and use, by the processing circuit, at least one actuator sandwiched between the servo writer elements to adjust a distance between the servo writer elements in response to determining that a difference between the actual spacing and the intended spacing is in a predetermined range.

In another embodiment, a computer program product as above also includes program instructions readable and/or executable by the processing circuit to cause the processing circuit to use, by the processing circuit, the at least one actuator to adjust the distance between the at least two servo writer elements to compensate for tape dimensional instability and/or lateral tape movement.

Any of these embodiments may be implemented in conjunction with a computer; or with a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 7 is a side view of a magnetic tape head with three modules in an overwrap configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a magnetic head having a plurality of servo writer elements, and an actuator, the actuator being sandwiched between first and second servo writer elements of the plurality of servo writer elements. The actuator is also configured to actively adjust a distance between the first and second servo writer elements.

In another general embodiment, a method includes determining an actual spacing between at least two servo tracks written on a magnetic tape by at least two servo writer elements, comparing the actual spacing with an intended spacing between the at least two servo tracks, and using at least one actuator sandwiched between the servo writer elements to adjust a distance between the servo writer elements of a magnetic head in response to determining that a difference between the actual spacing and the intended spacing is within a predetermined range.

In yet another general embodiment, a computer program product includes a computer readable storage medium having program instructions embodied therewith, the program instructions readable and/or executable by a controller to cause the controller to: determine, by the controller, an actual spacing between at least two servo tracks written on a magnetic tape by at least two servo writer elements, compare, by the controller, the actual spacing with an intended spacing between the at least two servo tracks, and use, by the controller, at least one actuator sandwiched between the servo writer elements to adjust a distance between the servo writer elements of a magnetic head in response to determining that a difference between the actual spacing and the intended spacing is within a predetermined range.

Figure 1A:
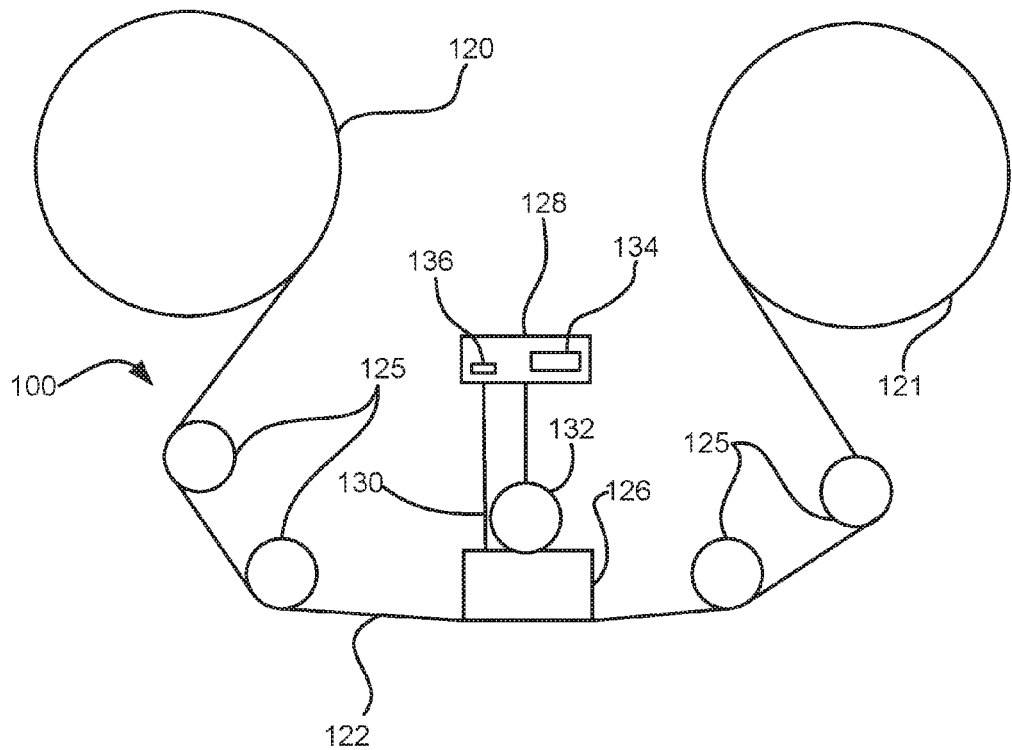
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
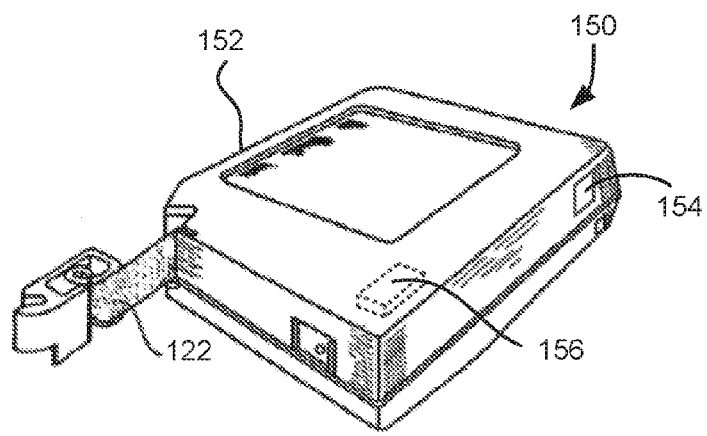
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
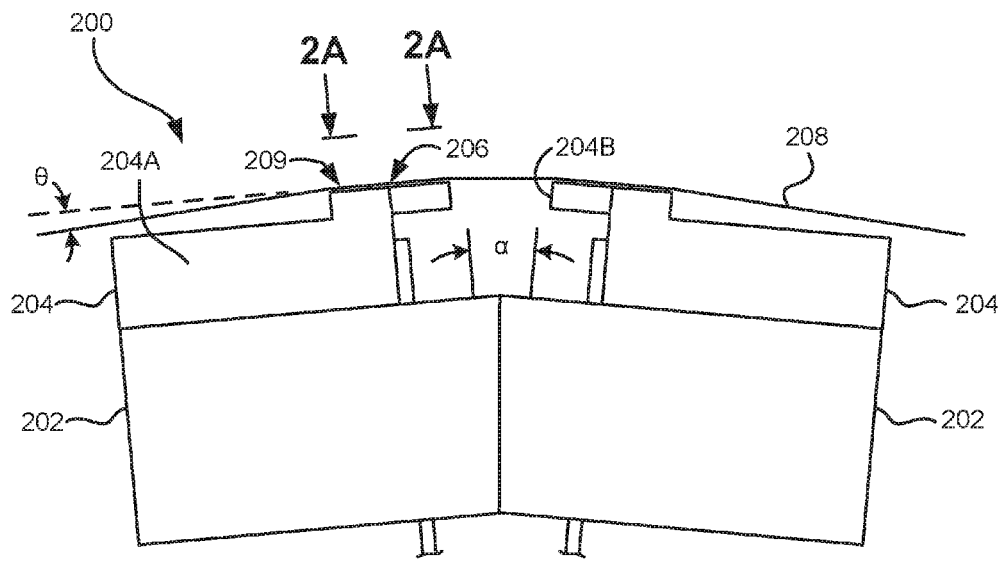
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
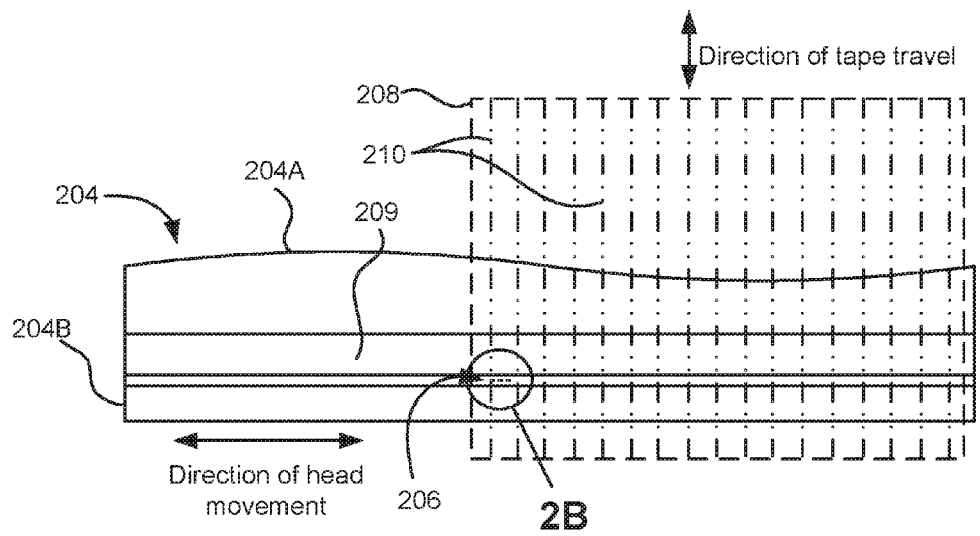
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
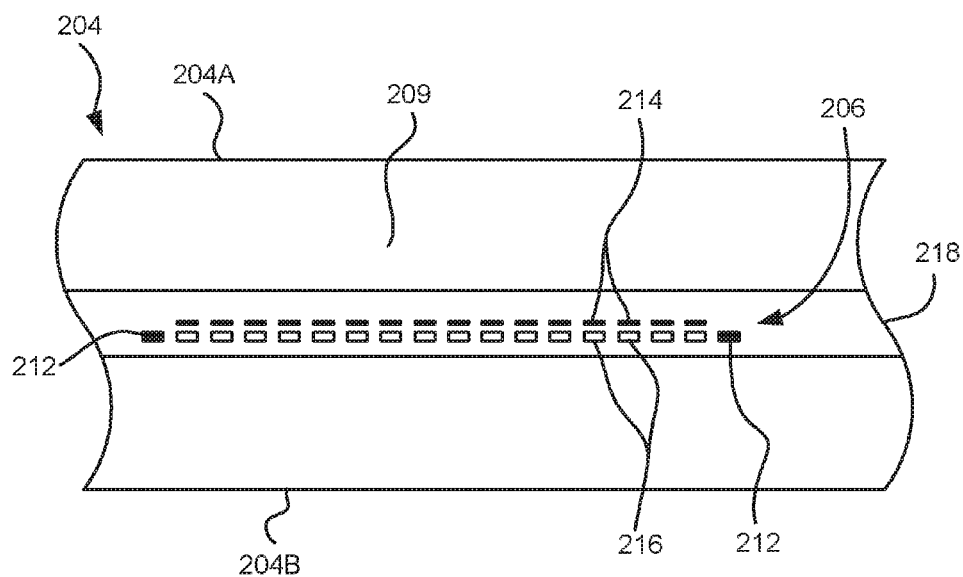
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
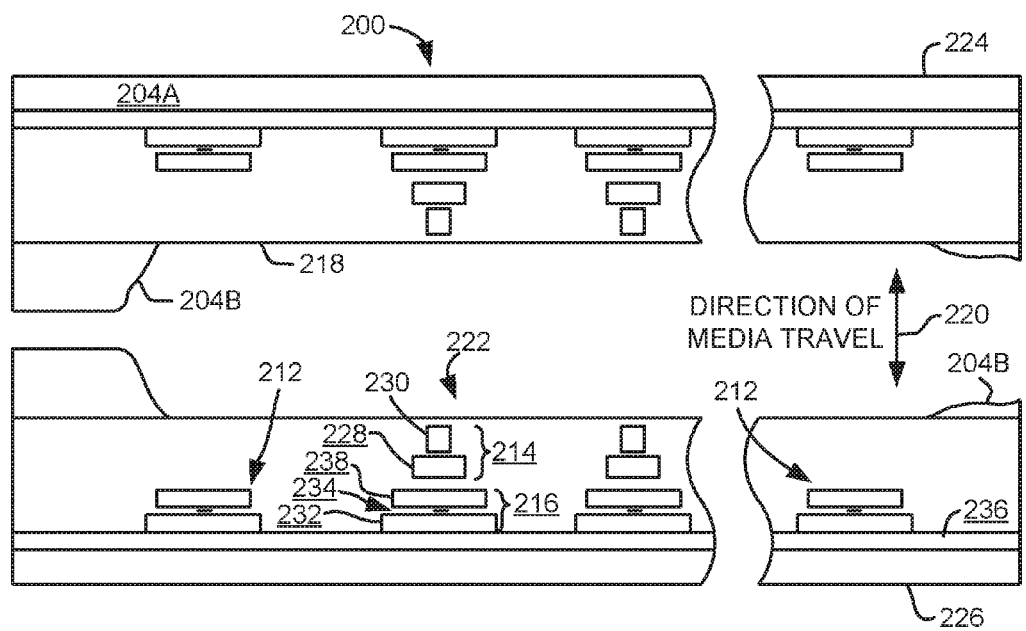
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
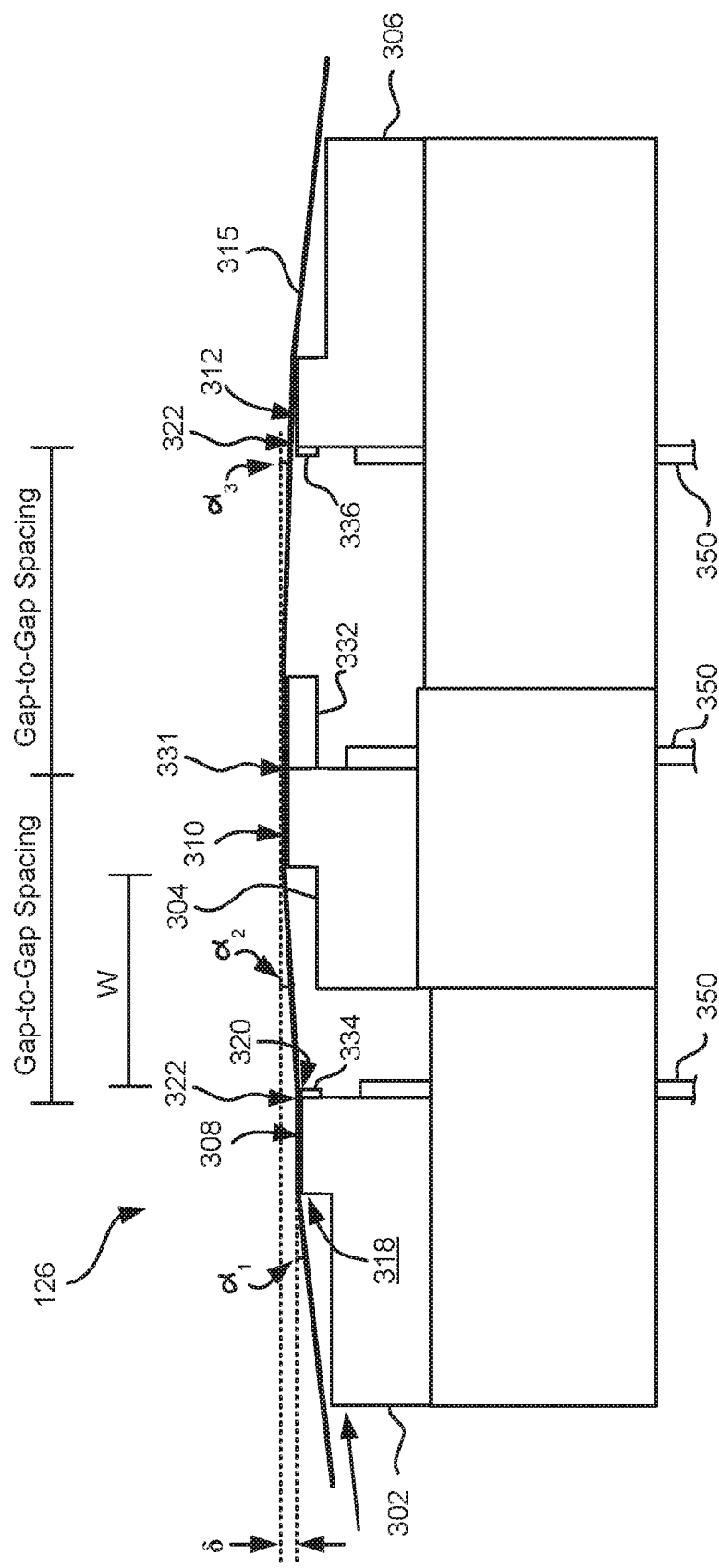
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
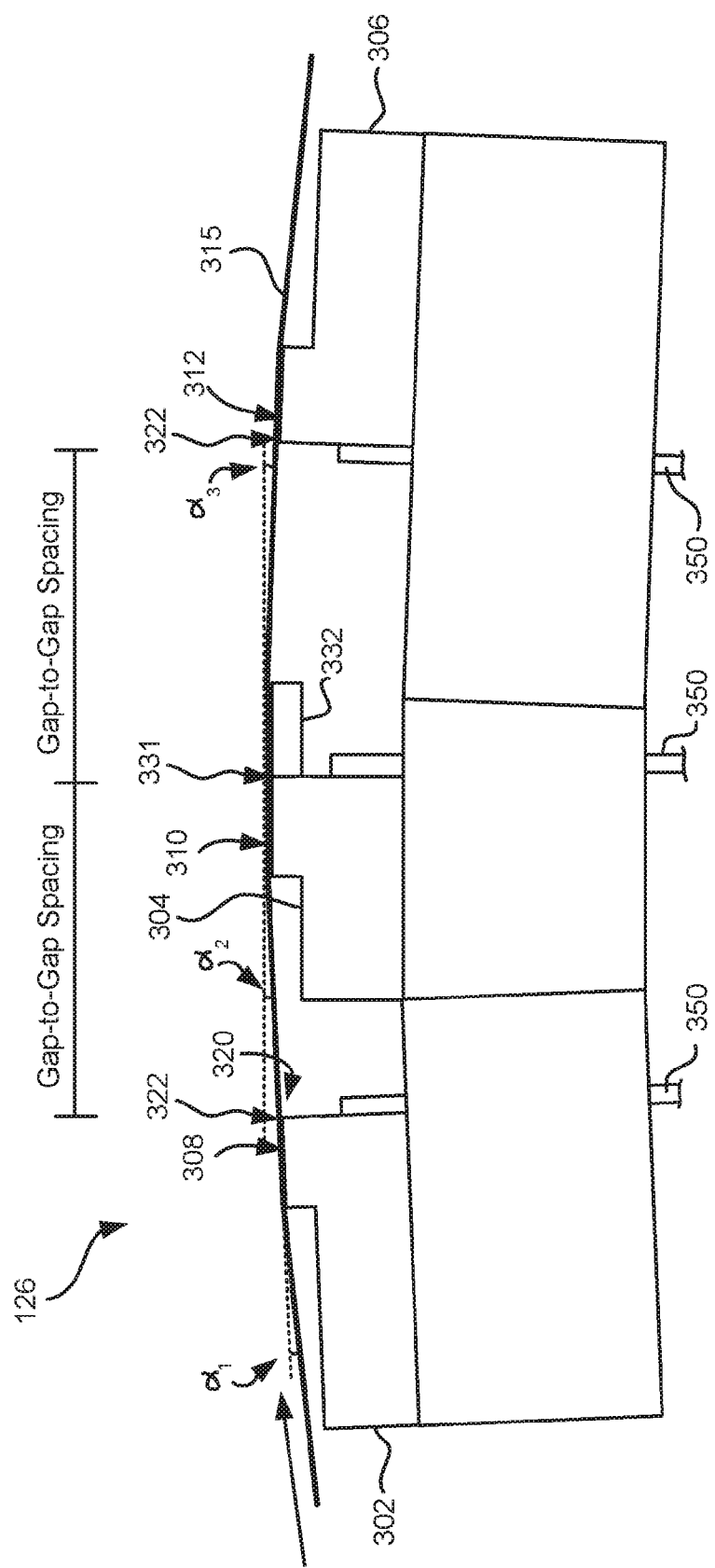
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used Linear Tape Open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle α₂ of the second module 304. In other words, the planes of the tape bearing surfaces 308, 312 of the outer modules 302, 306 are oriented at about the desired wrap angle α₂ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle α₂ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles α₁ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle α₁.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

As previously mentioned, data bands are typically defined on magnetic tapes between servo tracks. Moreover, during read/write operations, data readers and/or writers are preferably positioned to specific track positions within one of the data bands. Outer servo readers may be used to read the servo tracks which sandwich the data band being read from and/or written to as the tape travels in the intended direction of media travel. The servo signals may in turn be used to keep the readers and/or writers aligned with a particular set of tracks in the data band during the read/write operations.

Tape dimensional instability (e.g., tape expansion and/or contraction) and lateral tape movement present challenges when writing servo tracks to magnetic tape. In an ideal situation, the tape drive system would always be able to write servo tracks onto a tape in the ideal position based on servo track formatting characteristics, regardless of the extent of tape dimensional instability and/or lateral tape movement at any given time. However, as demonstrated in the following figures, tape dimensional instability, for example, provides challenges to writing servo tracks to magnetic tape.

Figure 8A:
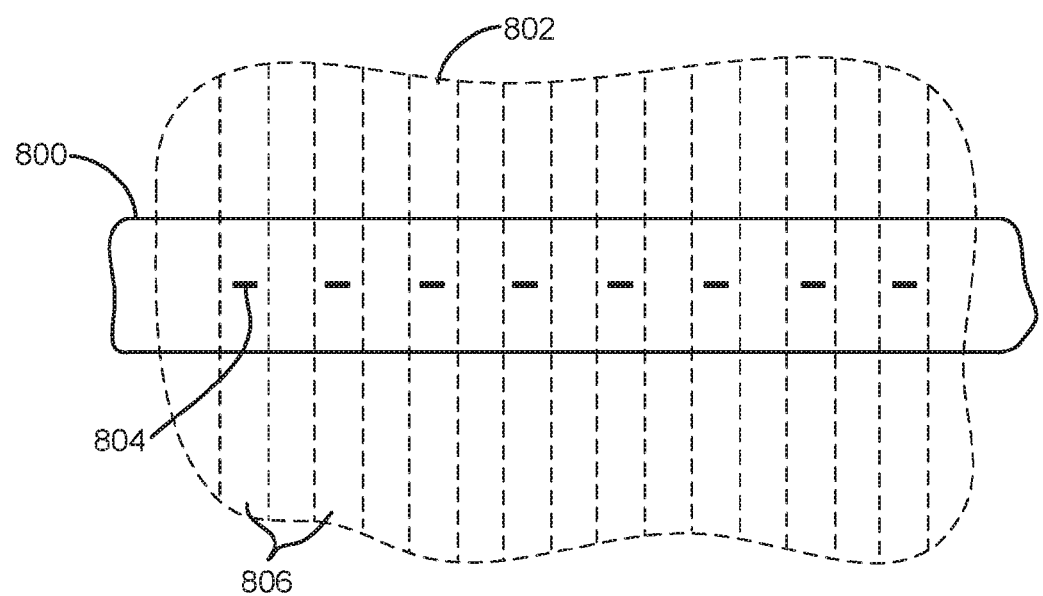
FIG. 8A is a simplified diagram depicting a module of a magnetic tape head above a tape having a nominal state of expansion.
Figure 8B:
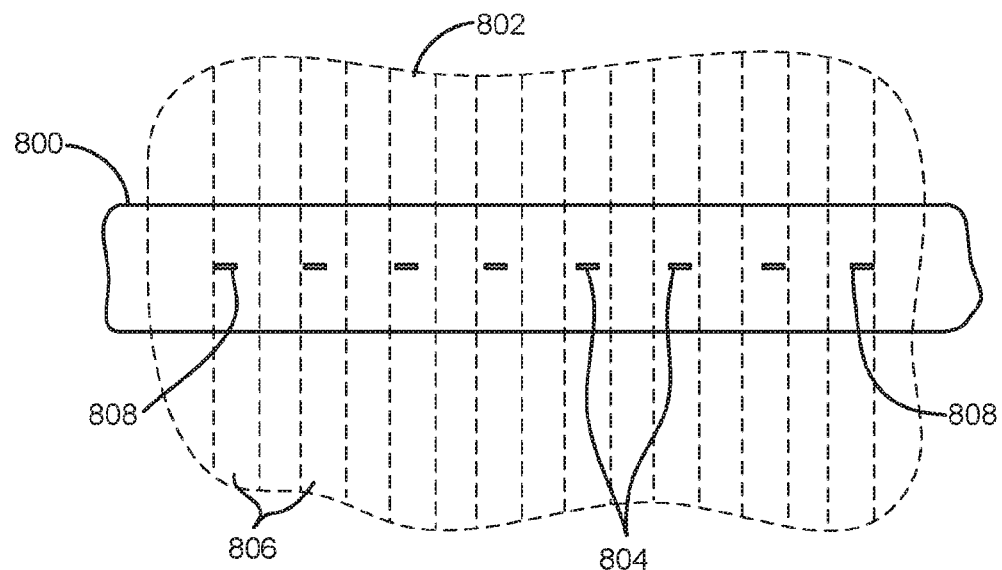
FIGS. 8B-8C are simplified diagrams depicting the effect of tape lateral contraction and expansion relative to a module of a magnetic tape head.
Figure 8C:
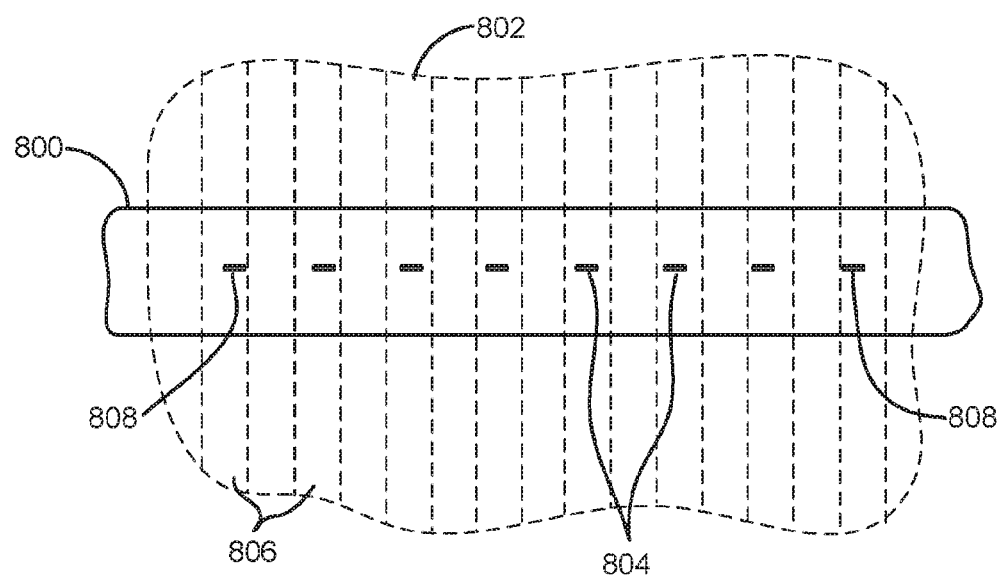

FIGS. 8A-8C include representational illustrations of the effects that tape lateral contraction and expansion have on magnetic tape with respect to transducer position relative thereto. FIG. 8A shows a head 800 relative to a tape 802, where the tape has a nominal width. As shown, the transducer 804 are aligned with the data tracks 806 on the tape 802. FIG. 8B shows the effect of tape lateral contraction. As shown, the outermost transducers 808 are proximate to the outer edges of the outer data tracks. FIG. 8C shows the effect of tape lateral expansion. As shown, the outermost transducer 808 are at least proximate to the inner edges of the outer data tracks. Because all of the transducer 804 generally have the same width, the readback signal level from each read transducer will normally be the same.

Although the representational illustrations of FIGS. 8A-8C are made using the relative position of transducers in relation to data tracks, similar effects are experienced by servo writer elements when formatting servo tracks. Tape expansion and/or contraction may cause servo writer elements to become offset from an intended position relative to tape, thereby causing the servo writer elements to write servo tracks out of the intended location on tape. It should also be noted that similarly undesirable effects may be experienced as a result of tape lateral movement, as would be appreciated by one skilled in the art upon reading the present description.

These issues are further exacerbated in conventional products which implement time base servo patterns which have a fixed spacing between servo tracks in the crosstrack direction (the direction orthogonal to the intended direction of media travel). As a result, although conventional products may have servo bands with unique patterns along the servo track in the intended direction of tape travel, these conventional products have a fixed (unadjustable) spacing between each of the servo tracks in the crosstrack direction. In other words, the data bands of all tapes formatted by a common servo writer in conventional products have a fixed, unadjustable width in the crosstrack direction.

In various embodiments described herein, the foregoing issues may be overcome by the introduced ability to selectively adjust the spacing between each of the servo writer elements, as will be described in further detail below. For example, if the tape is in an expanded state, a system may expand the crosstrack spacing between one or more pair of servo writer elements. If the tape is compressed, a system may contract the crosstrack spacing between one or more pair of servo writer elements.

The capability of adjusting the distance which separates one servo track from another servo track along the crosstrack direction can be used to improve functionality in more than one way. For instance, the ability to selectively adjust the spacing between each of the servo track writers may be used dynamically in a feedback control system such that, as they are written, the formatted patterns of the servo tracks are read (e.g., read-while-write functionality) with a reference head having a known distance separating each of the servo readers in the crosstrack direction. The feedback control system may thereby be able to provide error feedback to control the crosstrack separation between servo tracks, e.g., to reduce readback errors, improve track following, etc. However, according to another example, enabling a servo formatter head to adjust the spacing between servo tracks may be used to encode information, e.g., to enable identification of a data band being written to and/or read from, without writing unique encoding pattern to each servo band.

It follows that various embodiments described herein may additionally introduce the ability to encode information in the written servo tracks by selectively adjusting the spacing between each of the written servo tracks, e.g., for timing based servo systems. According to preferred approaches, these adjustments to the spacing between the servo tracks in the crosstrack direction are achieved by implementing one or more actuators amongst the servo track writers, e.g., on a magnetic head. As will soon become apparent, the actuators may include thermal, mechanical, and/or electrical mechanisms.

Figure 9A:
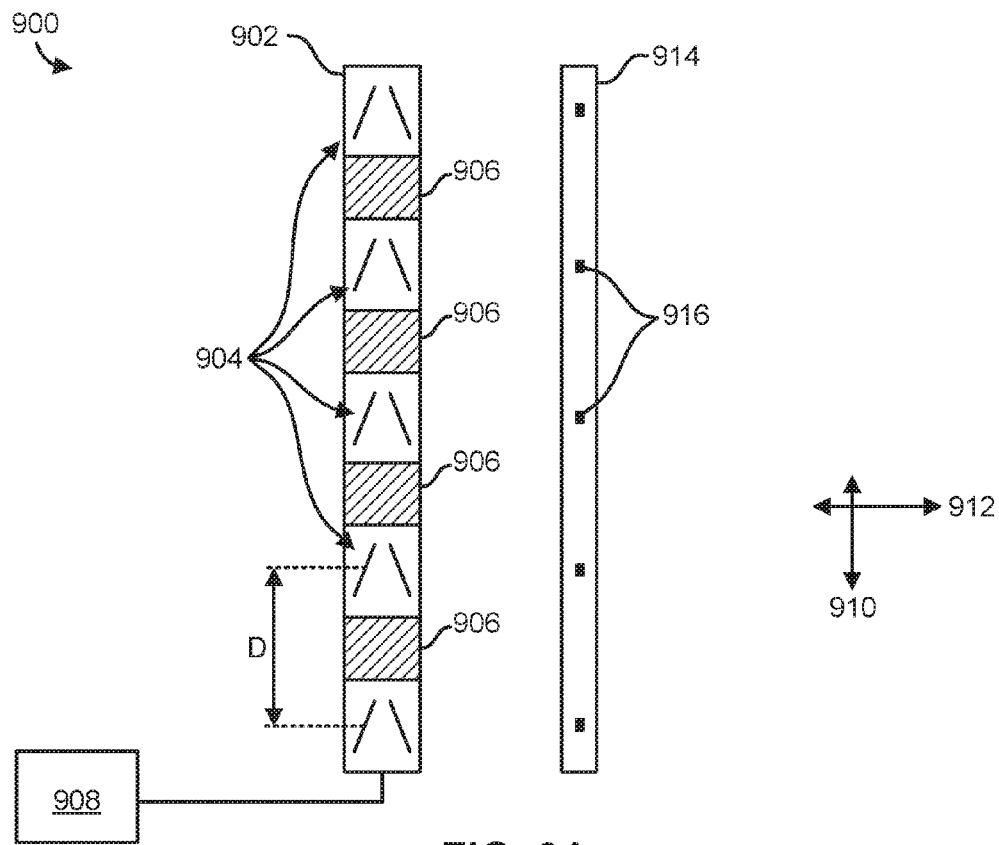
FIG. 9A is a top-down view of an apparatus according to one embodiment.

Looking to FIG. 9A, an apparatus 900 is illustrated in accordance with one embodiment. As an option, the present apparatus 900 may be implemented in conjunction with features from any other embodiment listed herein, such as those described with reference to the other FIGS. However, such apparatus 900 and others presented herein may be used in various applications and/or in permutations which may or may not be specifically described in the illustrative embodiments listed herein. Further, the apparatus 900 presented herein may be used in any desired environment. Thus FIG. 9A (and the other FIGS.) may be deemed to include any possible permutation.

The apparatus 900 includes a magnetic head 902 having a plurality of servo writer elements 904. The servo writer elements 904 may be of otherwise conventional design and/or construction. In one approach, each servo writer element 904 may include a magnetic yoke having nonmagnetic gaps arranged to write transitions to magnetic media upon application of a current to a coil that provides flux to the yoke. In FIG. 9A, each servo writer element has two gaps that together form two bars in a chevron-like shape each time the coil is energized. A typical servo pattern may include a series of the bars in each servo frame. Any known servo pattern may by written by the servo writer element. Moreover, the servo writer elements 904 may be individually addressable, commonly addressed, or a combination thereof.

With continued reference to FIG. 9A, actuators 906 are sandwiched between pairs of the plurality of servo writer elements 904. Apparatus 900 additionally includes a controller 908 electrically coupled to the magnetic head 902 and an optional read position verifier 914. The servo readers 916 positioned on the read position verifier 914 may be used to enable read-while-write functionality, e.g., by determining the crosstrack spacing between servo tracks by examining the timing information gathered from the servo track bursts as will be described in further detail below.

It should be noted that the number of servo writer elements 904 and/or actuators 906 illustrated in the present embodiment are in no way intended to limit the invention. Rather, the number of servo writer elements and/or actuators included in a given embodiment may vary depending on a number of different factors, including, but not limited to, the type of magnetic media associated therewith (e.g., a media generation), desired functionality, etc. For example, while the embodiment of FIG. 9A illustrates an actuator 906 positioned between each pair of servo writer elements 904, in other embodiments, a magnetic head may have at least two, at least three, at least four, multiple, etc., servo writer elements. Moreover, depending on the desired embodiment, an actuator may be sandwiched between each adjacent pair of the servo writer elements, sandwiched between some of the adjacent pairs of the servo writer elements, sandwiched between one adjacent pair of the servo writer elements (e.g., see FIG. 9B), etc.

As mentioned above, the actuators 906 may be used to actively adjust a distance D, e.g., center-to-center pitch, between adjacent servo writer elements 904 in the crosstrack direction 910 (perpendicular to the intended direction of tape travel 912). The ability to adjust the distance D separating the servo writer elements 904 allows for the apparatus 900 to selectively alter the crosstrack spacing between adjacent pairs of the servo tracks, thereby selectively altering the width of the data band defined between each pair of the servo tracks.

With continued reference to FIG. 9A, the ability to adjust the distance D separating the servo writer elements 904 may allow for the apparatus 900 to selectively alter the crosstrack spacing between adjacent pairs of the servo tracks to compensate for tape dimensional instability and/or tape lateral movement, as will be described in further detail below. This control enables a servo writing system to write servo tracks in the correct position despite lateral expansion/contraction or tape lateral movement.

In some embodiments, the crosstrack spacing between each pair of the servo tracks may be used to encode information. According to one approach, the crosstrack spacing between adjacent pairs of servo tracks may be selected to encode information, e.g., pertaining to a databand positioned between each of the pairs of the servo tracks. In other approaches, other information may be encoded by adjusting the crosstrack spacing between adjacent pairs of servo tracks as desired. It follows that the spacing between each pair of servo writer elements may be used to implement the encoded information when the servo tracks are written to tape by the servo writer elements.

Figure 10:
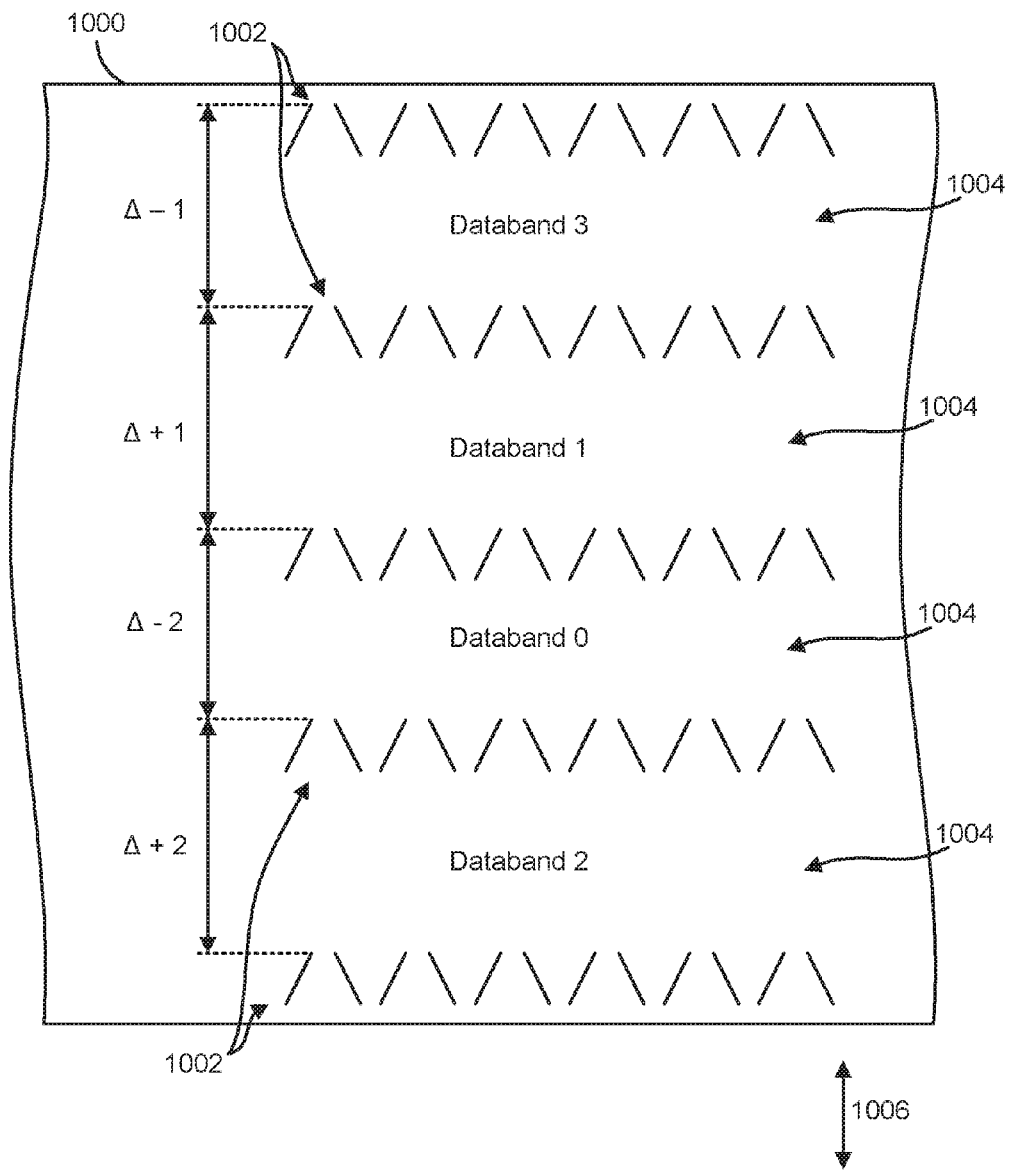
FIG. 10 is a partial top-down view of a magnetic medium according to one embodiment.

Depending on whether information is encoded by the spacing and/or on the information encoded by the spacing between each pair of servo tracks, the spacing between each pair of the servo tracks may be the same, similar and/or different than the spacing between remaining pairs of the servo tracks. In some approaches, the spacing between each pair of the servo tracks may be the same (e.g., substantially equal) between each of the servo writer element pairs, e.g., when formatting servo tracks on tapes compatible with particular tape formats. According to other approaches, the spacing between at least one pair of the servo tracks may different than spacing between remaining pairs of the servo tracks, e.g., to distinguish the two from each other. Looking to FIG. 10, an exemplary magnetic tape 1000 is illustrated as having servo tracks 1002 and data bands 1004 sandwiched therebetween. As shown, the crosstrack spacing between each adjacent pair of servo tracks 1002 is different from each other by an offset from a normal crosstrack servo track spacing Δ. Moreover, the offset from the normal crosstrack servo track spacing Δ may be used to signify the corresponding number of the data band 1004. For example, Databand 1 of tape 1000 is signified by an offset of +1 units from the normal crosstrack servo track spacing Δ in the crosstrack direction 1006, while Databand 0 is signified by an offset of −2 units from the normal crosstrack servo track spacing Δ in the crosstrack direction 1006. The correlation between the spacing offset and the corresponding data band 1004 may be stored in memory (e.g., in a lookup table). Moreover, the units and/or amount of the offset by which adjacent pairs of servo tracks are separated is preferably greater than an amount which may be achieved by tape dimensional instability and/or tape lateral movement. Thus, unintended lateral offsets resulting from tape dimensional instability and/or tape lateral movement may not compromise the information encoded by the servo track crosstrack separation offsets.

One or more of the actuators 906 (or any other actuator described herein) may be piezoelectric actuators according to some embodiments. Thus, the one or more piezoelectric actuators may be used to adjust the distance between adjacent ones of the servo writer elements 904 by expanding or contracting in response to application of a voltage thereto. However, it should be noted that actuators of different types may be implemented in combination with or in replacement of the piezoelectric actuators depending on the desired embodiment.

As will be appreciated by one skilled in the art upon reading the present description, piezoelectric actuators may expand and/or contract in a specified direction in response to application of a voltage thereto. Accordingly, in embodiments having piezoelectric actuators 906, the actuators 906 are preferably implemented such that expansions and/or contractions occur in the crosstrack direction 910, thereby adjusting the distance D between adjacent servo writer elements 904, thereby allowing for precise placement of servo pattern positions. Adjusting the distance D between adjacent servo writer elements 904 may, in some approaches, include shifting modules having one or more transducers (e.g., servo writer elements) attached thereto in the crosstrack direction 910, (e.g., see FIG. 9B).

Moreover, depending on the approach, a different number of the servo writer elements 904 and/or the actuators 906 may be independently addressable. For example, in some approaches, each of the servo writer elements 904 and each of the actuators 906 may be independently addressable (e.g., see the description of Table 1 below). However, in other approaches, only a subset of the servo writer elements 904 and/or a subset of the actuators 906 may be independently addressable. For example, two or more of the servo writer elements 904 may be coupled to a common lead and may thereby write the same signal simultaneously.

The actuators 906 are preferably able to adjust the distance D between adjacent servo writer elements 904 by an offset (e.g., amount) which is greater than a corresponding extent of tape dimensional instability (e.g., tape expansion and/or contraction) and/or lateral tape movement. In other words, a maximum amount which the actuators 906 are preferably able to expand and/or contract by enables adjustment of the distance D between adjacent servo writer elements 904 by an amount greater than the distance between servo tracks caused by tape dimensional instability and/or lateral tape movement. It follows that, in addition to being able to selectively adjust the spacing between adjacent ones of the servo writer elements 904, the actuators 906 may also be able to compensate for tape dimensional instability and/or lateral tape movement.

The controller 908 may be used to implement adjustments made to the distance D between adjacent servo writer elements 904. For instance, controller 908 may be used to control one or more of the actuators 906 to compensate for tape dimensional instability and/or lateral tape movement by expanding and/or contracting the one or more actuators 906 to make adjustments to the distance D between adjacent servo writer elements 904. As servo tracks are being written to a magnetic tape, the width of the tape (in the crosstrack direction) may change based on fluctuations in humidity, temperature, tension, etc. Thus, by adjusting the distance D separating one or more of the servo writer elements 904, the actuators are able to compensate for these changes in tape width and correspondingly write servo tracks at a desired (e.g., intended) position. An exemplary method of achieving a desired spacing between the servo writer elements is described below with reference to FIG. 12.

With continued reference to FIG. 9A, according to some approaches, adjustments may be made to distance D based on data gathered from the apparatus and its environment. For example, data gathered by a tape edge sensor or sensors electrically coupled to the controller 908 may be used to control one or more of the actuators 906. The tape edge sensor may optically, mechanically, computationally (e.g., based on a readback signal), etc. determine where the edge of tape is located at a given point in time relative to a reference (e.g., an intended tape edge location) and relay that information to the controller 908. Supplied with this edge of tape data, the controller may be able to make real-time adjustments to the actuators 906 to compensate for undesirable positioning of the tape edges. A known tape edge sensor may be used.

Additional adjustments may be made to compensate for the fringe effects caused by expansion and/or contraction of the actuators 906. For example, as a first actuator is expanded or contracted, e.g., to encode data via the distance D between the adjacent servo writer elements, the distance D separating the adjacent pair of servo writer elements 904 is adjusted, but the overall length of the magnetic head itself is expanded or contracted as well. Thus, although the adjustment of the distance D separating the adjacent pair of servo writer elements 904 may be desirable, this may cause an undesirable shift in the position of the remaining servo writer elements in relation to the remainder of the tape. Thus, to compensate for the expansion or contraction of the overall length of the magnetic head caused by the first actuator, the controller may be able to adjust at least a second actuator.

According to an example, if the distance D separating an adjacent pair of servo writer elements 904 is increased resulting from an expansion of a first actuator, outer ones of the servo writer elements 904 may be shifted off the edges of the tape in the crosstrack direction. Thus, the controller 908 may contract one or more of the remaining servo writer elements 904 such that the increased distance D (caused by the first actuator) is preserved while also maintaining the intended overall length L of the magnetic head.

Figure 9B:
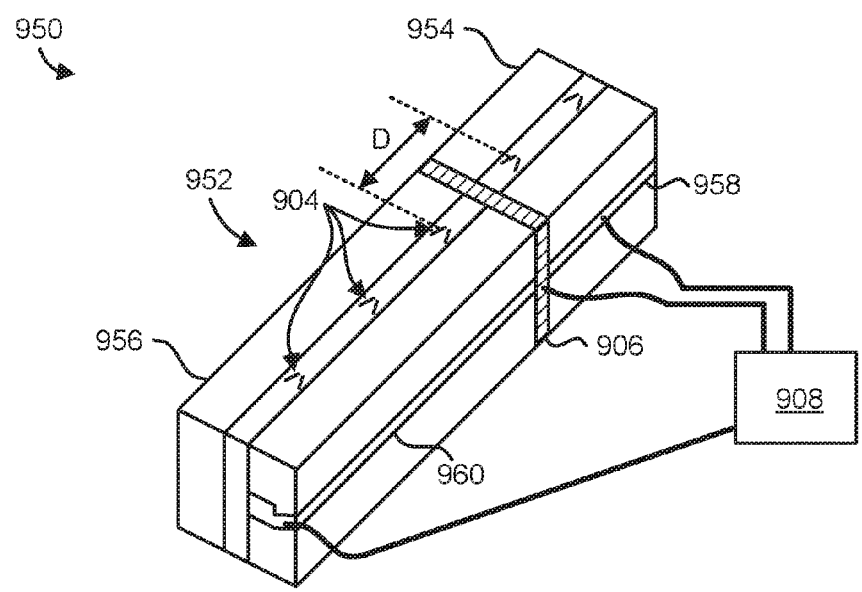
FIG. 9B is a partial perspective view of an apparatus according to one embodiment.

As briefly described above, embodiments described herein may include different numbers of actuators and/or servo writer elements. Looking to the example of FIG. 9B, an apparatus 950 is illustrated in accordance with one embodiment. As an option, the present apparatus 950 may be implemented in conjunction with features from any other embodiment listed herein, such as those described with reference to the other FIGS. Specifically, FIG. 9B illustrates a variation of the embodiment of FIG. 9A depicting another exemplary configuration within a magnetic head 952. Accordingly, various components of FIG. 9B have common numbering with those of FIG. 9A.

Such apparatus 950 and others presented herein may be used in various applications and/or in permutations which may or may not be specifically described in the illustrative embodiments listed herein. Further, the apparatus 950 presented herein may be used in any desired environment. Thus FIG. 9B (and the other FIGS.) may be deemed to include any possible permutation.

The apparatus 950 of FIG. 9B includes a magnetic head 952 having servo writer elements 904 positioned on first and second modules 954, 956. Moreover, modules 954, 956 are separated by an actuator 906 positioned therebetween. The actuator 906 effectively couples the modules 954, 956 together along the longitudinal axis thereof, while additionally enabling the ability to selectively adjust the distance D separating the adjacent pair of servo writer elements 904. In other words, sandwiching the actuator 906 between the modules 954, 956 enables the actuator 906 to adjust the separation between the modules 954, 956 along the longitudinal axis thereof, thereby selectively adjusting distance D.

Actuator 906 may be coupled to first and second modules 954, 956 using any of the approaches described above. For instance, actuator 906 may be coupled to the first module 954 and/or the second module 956 using adhesives (e.g., mechanical adhesion, chemical adhesion, etc.), fasteners, etc. Thus, as the actuator expands and contracts during use, the modules 954, 956 remain coupled to the actuator 906 and are moved along the longitudinal axes thereof by the expansion and contraction of the actuator 906 accordingly.

Different combinations of leads may be used to address the servo writer elements 904 of the modules 954, 956. According to the embodiment illustrated in FIG. 9B, servo writer elements 904 positioned on the first module 954 may be addressable by a first common lead 958 and servo writer elements 904 positioned on the second module 956 may be addressable by a second common lead 960. Moreover, leads 958, 960 and actuator 906 are coupled to controller 908 which may be used to control information (e.g., signals, servo write operations, changes in voltage, etc.) sent thereto. However, in other embodiments all servo writer elements 904 may be addressed by a common lead, each servo writer element 904 may be addressed by a unique lead, etc. Depending on how many leads are used to address each of the servo writer elements 904 different amounts of data may be encoded in the servo tracks. In other words, each group of servo writer elements 904 independently addressable by a given lead may be programmed to encode data in the servo track patters written to the medium. For instance, each group of servo writer elements 904 may be prompted by the corresponding lead to shift servo bars in each, every other, some, etc. of the servo frames (repeating patterned groups as would be appreciated by one skilled in the art) along the servo tracks in the intended direction of tape travel.

According to an example, which is in no way intended to limit the invention, in some instances it may be desirable to ensure that the spacing between each pair of servo writer elements in the crosstrack direction is about the same. As previously described, the various embodiments described herein are preferably compatible with defined tape formats (e.g., from existing tape generations) which may include equal spacing between each of the servo tracks along the crosstrack direction. Accordingly, any of the actuators described herein may include piezoelectric actuators which may be expanded and/or contracted to achieve a desired crosstrack spacing that is the same between each of the servo writer element pairs when formatting servo tracks on tapes having these previous tape formats. Furthermore, the controller may encode data by shifting servo bars in each, every other, some, etc. of the servo frames along the servo tracks in the intended direction of tape travel. Data encoded in the shifted servo bars in the servo frames along the servo tracks may include a longitudinal position, tape manufacturer information, format date/time, etc. Table 1 below shows an illustrative bit sequence corresponding to an example which is in no way intended to limit the invention.

TABLE 1

|      |   | Bit sequence | | | |
|------|---|---|---|---|---|
| Band | 0 | 1 | 1 | 1 | 1 |
|      | 1 | 1 | 1 | 1 | 0 |
|      | 2 | 1 | 1 | 0 | 1 |
|      | 3 | 1 | 1 | 0 | 0 |
|      | 4 | 1 | 0 | 1 | 1 |

As shown, the different bit sequences represent a way data may be encoded into the servo patterns of the different servo tracks written by an apparatus having independently addressable servo writer elements (e.g., as seen in FIG. 9A). Furthermore, Table 2 shows an illustrative bit sequence corresponding to another example which is in no way intended to limit the invention.

TABLE 2

|      |   | Bit sequence | | | |
|------|---|---|---|---|---|
| Band | 0 | 1 | 1 | 1 | 0 |
|      | 1 | 1 | 1 | 1 | 0 |
|      | 2 | 1 | 1 | 0 | 0 |
|      | 3 | 1 | 1 | 0 | 0 |
|      | 4 | 1 | 1 | 0 | 0 |

While Table 1 corresponds to an apparatus having servo writer elements which are each independently addressable, Table 2 corresponds to the common leads 958, 960 of apparatus 950. As shown the bit sequences for Bands 0-1 are the same while the bit sequences for Bands 2-4 are the same, but different than the bit sequences for Bands 0-1. As described above, servo writer elements 904 positioned on the first module 954 are addressable by a first common lead 958 while servo writer elements 904 positioned on the second module 956 are addressable by a second common lead 960. Accordingly, servo writer elements sharing a common lead will receive the same bit sequence.

It follows that servo readers may still glean servo data from the servo tracks despite the equal crosstrack spacing between adjacent servo tracks of previous tape formats in some embodiments. However, data may also be encoded in the servo frames along the servo tracks in embodiments implementing adjusted crosstrack spacing between adjacent servo tracks depending on the desired embodiment.

Referring again to FIG. 9B, although first and second modules 954, 956 each include more than one servo writer element 904, in other embodiments the modules 954, 956 may be configured such that only one servo writer element 904 is positioned on one of the modules 954, 956. It follows that, depending on the embodiment, any desired number of servo writer elements 904 may be positioned on the first and/or second module 954, 956. However, it is preferred that at least a first servo writer element 904 is positioned on the first module 954 and a second servo writer element 904 is positioned on the second module 956, e.g., to enable the ability to selectively adjust the spacing between at least one pair of the servo writer elements.

Furthermore, according to other embodiments, an apparatus may include more than two modules, each of the modules preferably being coupled together by placing actuators therebetween along the longitudinal axis thereof. For instance, an apparatus may include three modules, each of the three modules including one or more servo writer elements. Moreover, an actuator may be sandwiched between longitudinal ends of each pair of the three modules such that the three modules are coupled together as described and/or suggested herein.

Figure 11:
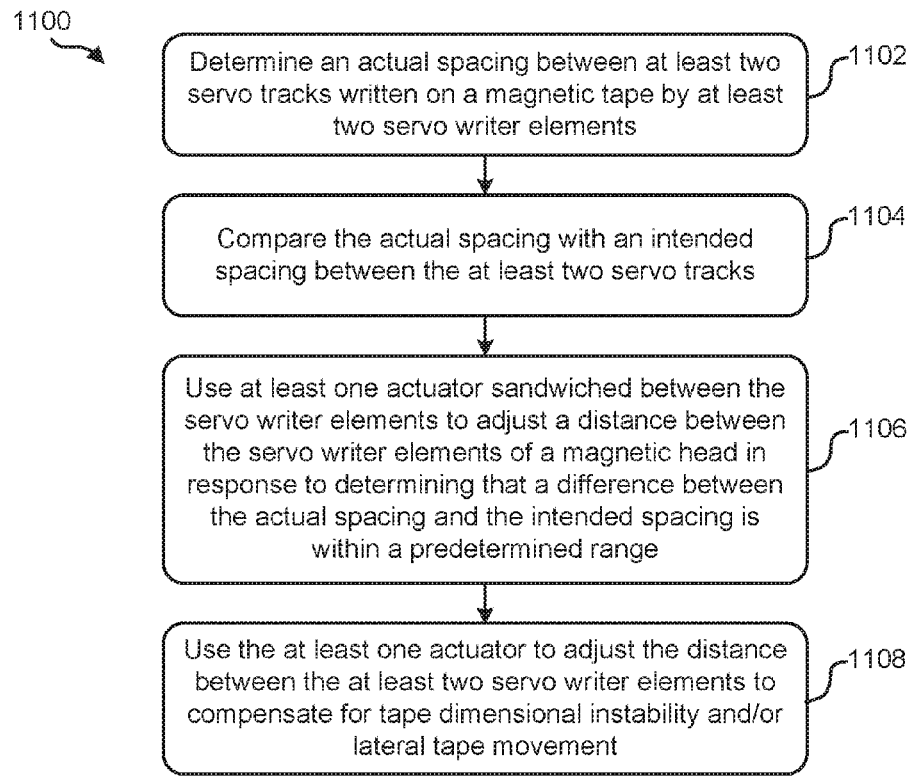
FIG. 11 is a flowchart of a method according to one embodiment.

FIG. 11 depicts a method 1100 for controlling the crosstrack spacing between servo writer elements, in accordance with one embodiment. As an option, the present method 1100 may be implemented in conjunction with features from any other embodiment listed herein, such as those described with reference to the other FIGS., such as FIGS. 8-9. However, such method 1100 and others presented herein may be used in various applications and/or in permutations which may or may not be specifically described in the illustrative embodiments listed herein. Further, the method 1100 presented herein may be used in any desired environment. Thus FIG. 11 (and the other FIGS.) may be deemed to include any possible permutation.

Method 1100 includes determining an actual spacing between at least two servo tracks written on a magnetic tape by at least two servo writer elements. See operation 1102. According to one approach, the actual spacing may be determined using a read position verifier as shown in FIG. 9A. The servo readers positioned on the read position verifier may be used to determine the actual spacing by examining the timing information gathered from the servo track bursts. As will be appreciated by one skilled in the art, timing information gathered from the servo track bursts may be used to determine a position of the reader in the servo track along the crosstrack direction by using the velocity of tape and the time required for the reader to pass from a first servo burst to a second servo burst of a servo frame.

Operation 1104 includes comparing the actual spacing with an intended spacing between the at least two servo tracks. The timing information gathered from the servo track bursts may be compared with expected timing information which corresponds to the intended spacing. The intended spacing may be any suitable distance, and may for example be predefined, selected by the system, specified by a format, set by a user, specified to encode data via the spacing, etc.

Figure 12:
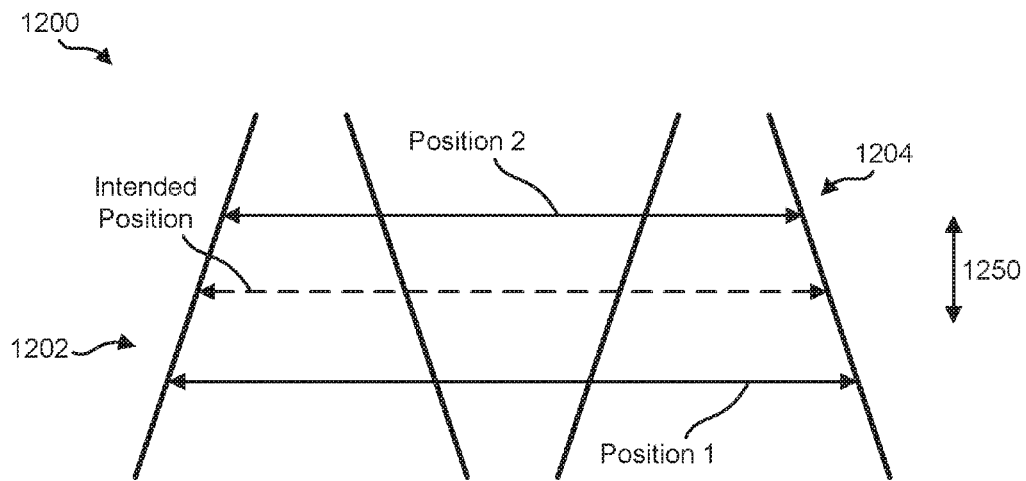
FIG. 12 is a representational view of a servo frame according to one embodiment.

Referring momentarily to the servo frame 1200 of FIG. 12, if it takes longer than anticipated for a servo reader to pass from a first servo burst 1202 to a second servo burst 1204 at a particular tape velocity, the servo reader may be deemed offset in the crosstrack direction 1250 from an intended position towards the wide side of the chevron pair as illustrated by Position 1. Alternatively, if it takes shorter than anticipated for a servo reader to pass from a first servo burst 1202 to a second servo burst 1204, the servo reader is offset from an intended position towards the narrow side of the chevron pair as illustrated by Position 2. Accordingly, this information gathered by the servo readers may be used to compare the actual crosstrack spacing between pairs (e.g., adjacent pairs) of servo tracks with an intended crosstrack spacing between pairs (e.g., adjacent pairs) of servo tracks.

Moreover, this gathered information directly correlates to the actual crosstrack spacing between pairs of servo writer elements used to write the servo tracks being examined. Accordingly, with continued reference to FIG. 11, operation 1106 includes using at least one actuator sandwiched between the servo writer elements to adjust a distance between the servo writer elements of a magnetic head in response to determining that a difference between the actual spacing and the intended spacing is undesirable, e.g., within a predetermined range, equivalently having a value outside a predetermined range, having an absolute value above a threshold, equivalently having a value below a threshold, etc., depending on the desired approach.

Again, the crosstrack spacing between each pair of the servo tracks may be used to encode information. According to one approach, the crosstrack spacing between adjacent pairs of servo tracks may be used to encode information pertaining to a databand positioned between each of the pairs of the servo tracks. In other approaches, other information may be encoded by adjusting the crosstrack spacing between adjacent pairs of servo tracks as desired. It follows that the intended spacing between each pair of servo writer elements may be used to implement the encoded information when the servo tracks are written to tape by the servo writer elements.

Depending on the information encoded by the spacing between each pair of servo tracks, the intended spacing between pairs of the servo tracks may be the same, similar and/or different than intended spacing between remaining pairs of the servo tracks. In some approaches, the intended spacing between each pair of the servo tracks may be the same (e.g., substantially equal) between each of the servo writer element pairs, e.g., when formatting servo tracks on tapes having a tape format with equal spacing between servo tracks. According to other approaches, the intended spacing between at least one pair of the servo tracks may be different than the intended spacing between remaining pairs of the servo tracks to distinguish the two from each other, e.g., see FIG. 10.

Method 1100 additionally includes optional operation 1108 which includes using the at least one actuator to adjust the distance between the at least two servo writer elements to compensate for tape dimensional instability and/or lateral tape movement. Thus, in addition to adjusting a crosstrack distance between the servo writer elements to ensure a desired correspondence between the actual spacing and the intended spacing between each of the servo writer elements, the one or more actuators may be used to compensate for tape dimensional instability and/or lateral tape movement. Accordingly, the actuators described herein may be configured to adjust the distance between adjacent pairs of servo writer elements by an offset which is greater than a corresponding extent of tape expansion and/or contraction.

Again, as servo tracks are being written to a magnetic tape, the width of the tape (in the crosstrack direction) may change based on fluctuations in humidity, temperature, tension, etc. Thus, by adjusting the distance separating one or more of the servo writer elements as seen in FIGS. 9A-9B, the actuators may be able to compensate for these changes in tape width and correspondingly write servo tracks at a desired (e.g., intended) position. Similarly, the effects of tape lateral offsets experienced while tape is being moved over a magnetic head may be overcome by expanding and/or contracting certain ones of the actuators. Tape dimensional instability and/or lateral tape movement may be determined using a tape edge sensor which optically, mechanically, computationally (e.g., based on a readback signal), etc. determines where the edge(s) of tape is/are located at a given point in time relative to a reference (e.g., an intended tape edge location). The tape edge sensor may relay that information to a controller, whereby the controller may be able to make real-time adjustments to actuators to compensate for undesirable positioning of the tape edges resulting from the tape dimensional instability and/or lateral tape movement.

Adjustments to the distance separating pairs of servo writer elements may be performed in real time, e.g., based on information gathered from the servo writer elements themselves and/or the servo tracks as they are written to tape (e.g., formatted). Moreover, the actuators used are preferably able to expand and contract fast enough to make real-time adjustments to the crosstrack separation between adjacent pairs of servo writer elements, e.g., such as piezoelectric actuators. According to one approach, a read position verifier (e.g., see 914 of FIG. 9A) may follow a servo writer head downstream and read the servo tracks as they are written, thereby providing read-while-write functionality. As the servo tracks are written, information read by the read position verifier may be relayed back to a controller where actual and ideal positioning of the servo tracks may be compared, e.g., as described above in the method of FIG. 11. Moreover, adjustments may be made to the actuators in-real time based on the results of the comparison, thereby achieving improvements to the position of the servo writer elements during operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product comprising a computer readable storage medium having program instructions embodied therewith, the program instructions readable and/or executable by a processing circuit to cause the processing circuit to:
   determine, by the processing circuit, an actual spacing between at least two servo tracks written on a magnetic tape based on signals from at least two servo writer elements;
   compare, by the processing circuit, the actual spacing with an intended spacing between the at least two servo tracks; and
   use, by the processing circuit, at least one actuator sandwiched between the servo writer elements to adjust a distance between the servo writer elements in response to determining that a difference between the actual spacing and the intended spacing is in a predetermined range.

2. The computer program product of claim 1, wherein an intended spacing between at least one pair of the servo tracks is different than an intended spacing between remaining pairs of the servo tracks.

3. The computer program product of claim 1, wherein an intended spacing between each pair of the servo tracks is substantially equal.

4. The computer program product of claim 1, wherein the actuator is configured to adjust the distance between the servo writer elements by an offset which is greater than a corresponding extent of tape expansion and/or contraction.

5. The computer program product of claim 1, wherein the actuator is piezoelectric and adjusts the distance between the servo writer elements by expanding or contracting upon application of a voltage thereto.

6. The computer program product of claim 1, the program instructions readable and/or executable by the processing circuit to cause the processing circuit to: cause the at least one actuator to adjust the distance between the servo writer elements to compensate for tape dimensional instability and/or lateral tape movement.

7. The computer program product of claim 6, wherein adjustments to the distance are performed in real time based on the difference between the actual spacing and the intended spacing.

8. The computer program product of claim 6, wherein a tape edge sensor is used to determine the tape dimensional instability and the lateral tape movement.

9. A computer program product comprising a computer readable storage medium having program instructions embodied therewith, the program instructions readable and/or executable by a processing circuit to cause the processing circuit to:
   determine, by the processing circuit, an actual spacing between at least two servo tracks written on a magnetic tape based on signals from at least two servo writer elements;
   compare, by the processing circuit, the actual spacing with an intended spacing between the at least two servo tracks;
   use, by the processing circuit, at least one actuator sandwiched between the servo writer elements to adjust a distance between the servo writer elements in response to determining that a difference between the actual spacing and the intended spacing is in a predetermined range; and
   use, by the processing circuit, the at least one actuator to adjust the distance between the at least two servo writer elements to compensate for tape dimensional instability and/or lateral tape movement.

10. The computer program product of claim 9, wherein an intended spacing between at least one pair of the servo tracks is different than an intended spacing between remaining pairs of the servo tracks.

11. The computer program product of claim 9, wherein an intended spacing between each pair of the servo tracks is substantially equal.

12. The computer program product of claim 9, wherein the actuator is configured to adjust the distance between the servo writer elements by an offset which is greater than a corresponding extent of tape expansion and/or contraction.

13. The computer program product of claim 9, wherein the actuator is piezoelectric and adjusts the distance between the servo writer elements by expanding or contracting upon application of a voltage thereto.

14. The computer program product of claim 9, the program instructions readable and/or executable by the processing circuit to cause the processing circuit to: cause the at least one actuator to adjust the distance between the servo writer elements to compensate for tape dimensional instability and/or lateral tape movement.

15. The computer program product of claim 14, wherein adjustments to the distance are performed in real time based on the difference between the actual spacing and the intended spacing.

16. The computer program product of claim 14, wherein a tape edge sensor is used to determine the tape dimensional instability and the lateral tape movement.

\* \* \* \* \*